United States Patent [19]
Bruner

[11] Patent Number: 4,832,083
[45] Date of Patent: May 23, 1989

[54] VALVE APPARATUS
[76] Inventor: Thomas M. Bruner, 15802 Heatherdale, Houston, Tex. 77059
[21] Appl. No.: 256,127
[22] Filed: Oct. 7, 1988

Related U.S. Application Data
[63] Continuation of Ser. No. 75,773, Jul. 20, 1987, abandoned.
[51] Int. Cl.$^4$ .............................................. F16K 27/00
[52] U.S. Cl. .................................... 137/861; 251/329; 251/366
[58] Field of Search ............... 137/886, 861; 251/326, 251/329, 366; 29/157 T, 157.1 R

[56] References Cited
U.S. PATENT DOCUMENTS

| | | | |
|---|---|---|---|
| 569,040 | 10/1896 | Eichhorn | 137/886 X |
| 2,598,961 | 6/1952 | Andrus | 137/886 X |
| 2,642,894 | 6/1953 | Burnett | 251/198 X |
| 2,906,295 | 9/1959 | Ver Nooy | 138/94 |
| 3,232,577 | 2/1966 | Sargent | 251/329 X |
| 4,091,840 | 5/1978 | Grove et al. | 137/861 X |

Primary Examiner—A. Michael Chambers
Assistant Examiner—John C. Fox
Attorney, Agent, or Firm—Dodge, Bush & Moseley

[57] ABSTRACT

A valve apparatus having a three-flow line connectable flow housing with the valve closure located to enable control of the flow through the branch line while leaving primary straight through flow unaffected. The branch line flow is controlled by a conventional vertically reciprocable gate-type closure operated by a rotatable stem. The valve apparatus combines the functions of a conventional Tee-fitting and block valve in a relatively inexpensive unit. The disclosed valve apparatus is particularly useful in fluid flow networks or systems in which a primary conduit is provided with branch connections.

3 Claims, 1 Drawing Sheet

VALVE APPARATUS

This application is a continuation, of application Ser. No. 075,773, filed July 20, 1987 now abandoned.

BACKGROUND OF THE INVENTION

1. Field of the Invention

The present invention relates to the field of valves for controlling fluid flow and more particularly a valve apparatus for controlling flow into a branch conduit of a fluid distribution network.

2. Background

U.S. Pat. No. 631,699 to Darragh, et al discloses a conventional gate-type or, alternately, a globe-type valve for controlling flow of fluid. The conventional two-way gate-type valve housing forms a portion of a fluid containing conduit providing a straight through flow path between axially aligned inlet and outlet openings or ports. The hollow housing includes an internal flow cavity communicating the two housing flow openings. The gate-type flow closure element is disposed in the flow cavity and reciprocated or shifted between the open and closed positions by manual rotation of a helically threaded stem or shaft. The valve stem extends through a releasable valve bonnet that closes the housing cavity and which carries packing to prevent leakage between the stem and bonnet. Side ports or openings are provided in the disclosed valve housing to enable use as a three or four way valve, if desired, or to enable repid change of the gate member when appropriate. When the closure member is moved to the lower closed position fixed seat or port carried by the housing, all flow through the valve is terminated.

U.S. Pat. No. 825,064 to Levey discloses a valve apparatus having two inlets and a single outlet. Reciprocating movement of the gate like flow control element effect by stem movement selects one of the two inlets for communicating with the outlet while blocking flow through the other outlet. The Levy apparatus serves as a diverter or flow switching device rather than as an on-off valve.

U.S. Pat. No. 1,190,698 to King discloses a valve apparatus having a rotatable stem employing a helical thread arrangement to reciprocably move a flow closure element that is used in well drilling operations as a blowout preventer. When the closure is shifted into the open position, all three housing flow ports are placed in flow communication. When the flow closure element is shifted to the close position, straight through vertical flow is blocked and flow from the lower vertical opening is diverted into the horizontal Tee-branch. The disclosed apparatus cannot be employed to isolate the horizontal flow opening from either vertical opening or the straight through vertical drilling passageway.

U.S. Pat. No. 3,033,515 to Brisbane disclosures a reotatable plug valve operably disposed in a three-way flow valve housing in FIG. 5-8. The ported rotatable plug flow closure element enables a straight through flow path or passage or between the axially aligned flow openings, but which arrangement greatly increases the size, weight and cost of the valve. In addition, a powerful actuator is requird to assist an operator to manipulate the closure element between operating positions in all but the smallest sizes. Such actuator requirement further increases the size and cost of the valve apparatus.

U.S. Pat. No. 3,068,901 is entitled "Three Way Gate Valve". The expandable gate member is positioned to select which of the two valve housing outlet ports the flow will be diverted through. while providing a direct full open and unobstructed straight direct flow passageway in one condition, the other operating condition of the gate closes that direct flow path for directing all flow at a right angle.

In U.S. Pat. No. 3,771,561 to Santamaria, an outlet conduit selective flow control apparatus is disclosed for directing flow from a common or supply inlet through one of two outlet openings. A reciprocating slide or gate is shifted to control or select the outlet opening forming the desired flow path.

Curran U.S. Pat. No. 3,771,562 discloses a three way valve suitable for both flow divergence (separation) or convergence (mixing). Two side ports and a bottom port are provided by the three way valve housing. No straight through path between the side ports is provided. The bottom port is arranged to continuously communicate or connect with either one or both side ports. A pressure balance reciprocating sleeve serves as a flow blocking member to control the desired flow path.

U.S. Pat. No. 4,327,772 disclosed a three ported or three way valve housing having a shiftable closure element for selectively diverting flow through one of the two outlets. No unrestricted straight through flow path is provided in either operating condition.

Each of the forgoing patents is hereby totally incorporated by this specific reference for forming a portion of this disclosure as if the contents of each were fully set forth herein.

SUMMARY OF THE INVENTION

The present invention relates to a new and improved valve apparatus for controlling flow from a main flow conduit into a branch conduit. A valve housing is mountable with both conduits to form a straight unobstructed flow path for the main or primary conduit while positioning a conventional flow closure assembly, such as a reciprocating gate-type, butterfly or plug type flow closure element in the branch conduit. The valve apparatus employs a conventional helically threaded rotatable stem for operably shifting the gate closure between open and closed positions to control flow through the branch conduit. The three-way ported valve housing serves as both a conventional tee-fitting and a block valve to minimize cost and space of the valve apparatus installation.

An object of the present invention is to provide a new and improved valve apparatus.

A further object of the present invention is to provide a new and improved valve apparatus for controlling flow through a branch conduit.

Yet another object of the present invention is to provide a new and improved valve apparatus having a three-ported housing which forms a conventional conduit Tee-fitting and branch conduit block valve.

DESCRIPTION OF THE PREFERRED EMBODIMENT

Figure 1:
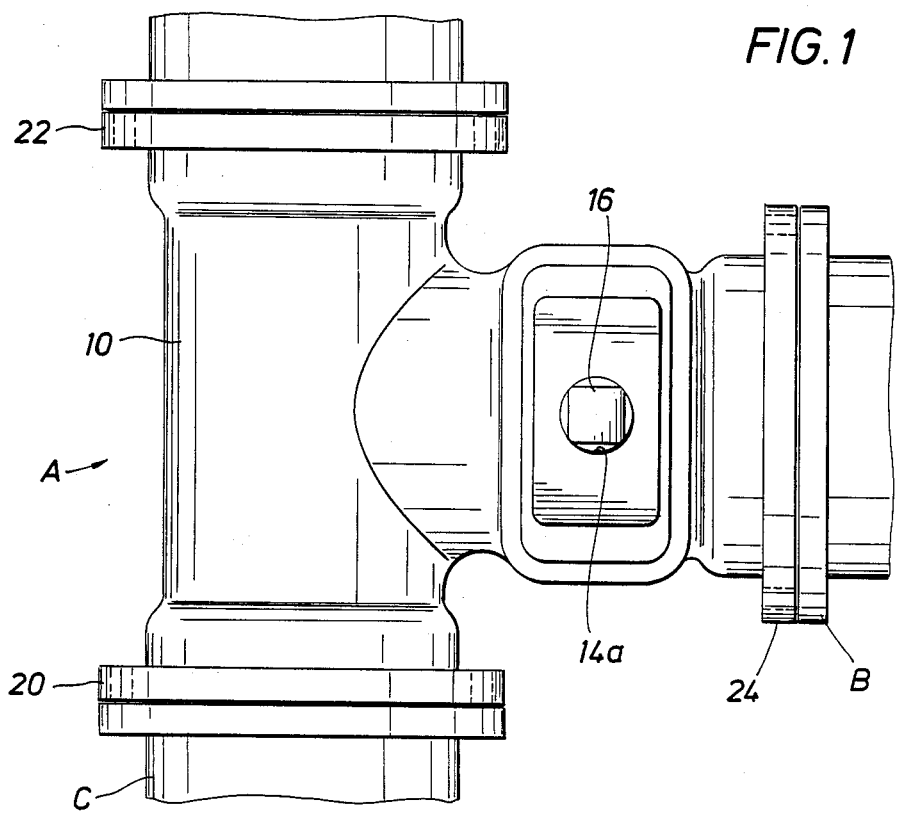
FIG. 1 is a top view of the valve apparatus of the present invention.

The valve apparatus of the present invention, generally designated A, is illustrated in FIG. 1, operably installed in and forming a portion of a straight primary fluid flow conduit C. The valve apparatus A is also operably connected in flow communication with a branch conduit B and serves to control communication or flow between the primary conduit C and the branch conduit B. The conduits B and C may be employed in any type of fluid manifold or network, with the secondary conduit B disposed at a right angle to the primary conduit C.

Such primary conduit C and branch conduit B connections arrangements are commonly found below ground in water or other fluid distribution or collection systems. Both potable water and fire protection water distribution systems whether privately or publicly owned, normally employ this arrangement. Because of the high volume or quantity of flow of water in such systems, both the primary C conduit and branch conduits B, are relatively large in size, usually exceeding 4" in internal flow diameter. As a result, the conduits and associated flow equipment such as valve apparatus are expensive, difficult to handle and have limited access for maintenance or operation.

Conventional connections of a primary conduit C with a branch conduit B employ a standard Tee-fitting (not illustrated) to provide a suitable fluid branch conduit communication means. A conventional flow closure means, such as a two-way gate-type valve is then usually secured directly to the branch outlet forming Tee-fitting to serve as a block valve for isolating the branch conduit B from the primary conduit when desired. Other forms of flow closure means, such as butterfly or plug closures may be employed if desired. With such an arrangement, the cost of both the Tee-fitting and separate block valve are incurred as well as the additional cost of installing two items. As a typical water distribution system employs many such connections, the additional costs are multiplied many times. With the valve apparatus A of the present invention, a significant saving for each installation is effected and which savings may be multiplied many times in even a modest sized water distribution system. However, ti will be understood that the valve apparatus A of the present invention is not limited to a water flow network as any desired fluid may be controlled using the present invention.

Figure 2:
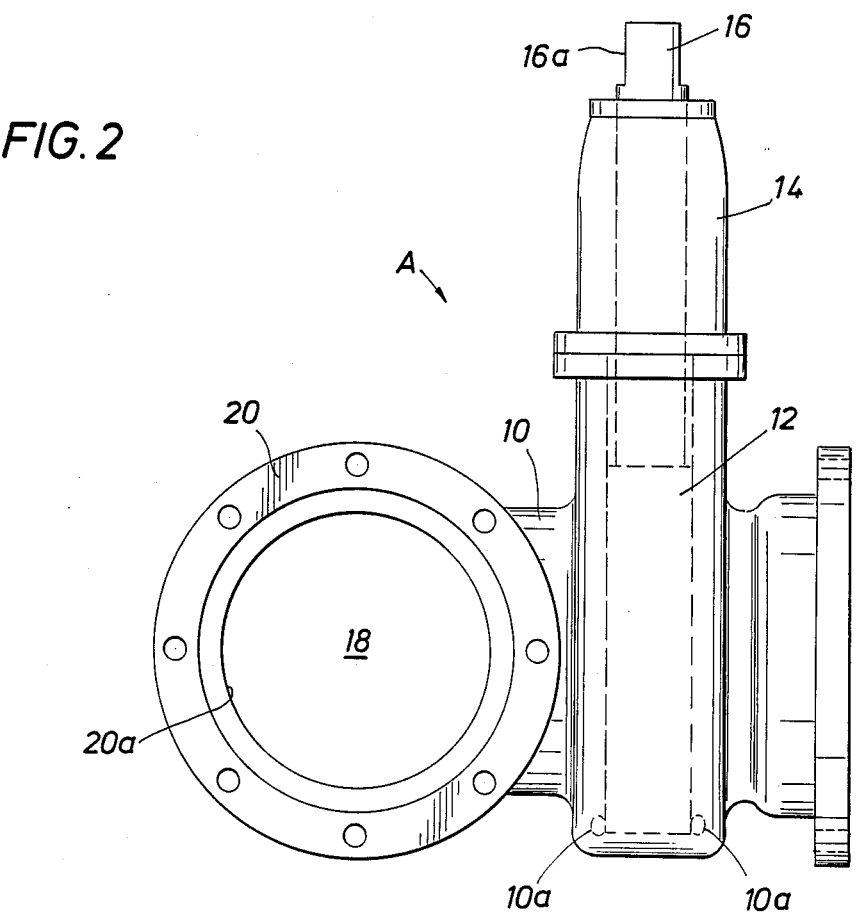
FIG. 2 is a side view of the valve apparatus of the present invention with the location of the conventional operator and closure means illustrated in phantom.

As illustrated in FIGS. 1 and 2, the valve apparatus A of the present invention includes a valve body or housing 10, a movable flow closure element or gate 12, a valve bonnet 14 and an operating stem 16. The hollow valve housing 10 forms a central flow communicating cavity or passageway 18 in which the fluid 10 to be controlled is contained.

The bonnet 14 is releasably secured and sealed to the valve housing 10 in any desired conventional manner to partially form the cavity 18 and provide suitable access for assembly and maintenance. The bonnet 14 is provided with an opening 14a through which the rotatable operating stem 16 extends in the usual manner. The stem 16 may be provided with suitable flats 16a exteriorly of the bonnet 14 for effecting operating rotation of the stem 16 in the usual manner. Suitable packing (not illustrated) is carried by the bonnet 14 adjacent the stem opening 14a for sealing between the bonnet 14 and stem 16 to prevent leakage of fluid therebetween from the cavity 18 in the known manner.

The stem 16 is operably connected to the movable flow closure element 12 to effect movement of the element 12 in the known manner. Preferably, a conventional gate-type flow closure element 12 is provided which sealingly engages suitable complimentary seat rings 10a mounted by the the housing 10 in the cavity 18 when the gate 12 is in the lower or closed flow blocking position. Other arrangemets for sealing to block leakage are known and may be employed if desired. The stem 16 is provided with a suitable conventional helical thread arrangement in order that the gate 12 will be reciprocated on shifted upwardly from the fixed seats 10a into the bonnet 14 in response to rotation of the stem 16 to enable flow in the known manner. Reference may be had to previously mentioned and incorporated U.S. Pat. No. 631,699 for a more detailed description of the well known specifics of operation and construction of a conventional gate-type valve.

The valve housing 10 is provided with a Tee-like shape having three way flanged end connection 20, 22 and 24 for mounting in flow communication with the associated conduits B and C. While the illustrated flanged end connections for bolting are preferred and conventional for water service, other known suitable forms of end connection may be provided as desired. Such form or type of end communications may also vary by location on the valve apparatus A in order to be compatible with the conduits B or C.

As illustrated in FIG. 2, the first annular flange 20 surrounds an associated first inlet port or opening 20a formed in the housing 10 which communicates with the central flow cavity 18 in the known manner. The second and third flanges 22 and 24 surround associated second and third ports respectively, on openings, (not illustrated) in substantially an identical manner for also communicating with the interior cavity 18. The flanges 20 and 22 are connected in order that openings in flanges 20 and 22 communicate with separate portions of the primary conduit C so the housing 10 forms a portion thereof.

The flow openings formed by the first flanges 20 and the second flanges 22 are axially aligned (FIG. 2) for providing a substantially unrestricted straight through flow passage in cavity 18 through the valve apparatus A for the primary conduit C. Preferably, the flanges 20 and 22 are maintained to the same spacing as a standard dimension Tee-fitting for the size of conduit C in order that the valve apparatus A may be interchangeably inserted or installed into the primary conduit C as a replacement for an existing branch Tee-fitting.

The third flange 24 is secured with the branch conduit B to communication of the associate flow opening with the cavity 18 and branch conduit B is a similar manner. The flaneg 24 is oriented or disposed perpendicular to that of flanges 20 or 22.

The movable flow closure gate 12 is mounted by the housing 10 so as not to interrupt flow or communication between the valve housing openings in flanges 20 and 22 at any time. When the gate 12 is operated closed by rotation of the stem 16, flow communication of the openings in flanges 20 and 22 with the third flange opening 24a is interrupted or blocked for preventing flow into or out of the branch conduit B. When the gate 12 is operated open, all three flange openings are placed in flow communication for enabling flow to or from the primary flow conduit C with the branch conduit B.

USE AND OPERATION

In the use and operation of the Present Invention, the assembled valve apparatus A is operably installed as the primary and branch conduits C and B in the conventional manner illustrated in FIG. 1. By rotating the valve stem 16 in the approrpiate direction using the flats 16a, the position of the flow controlling gate 12 is selected to either permit or block flow of the primary conduit C with the branch conduit B as desired.

The foregoing disclosure and description of the invention are illustrative and explanatory thereof, and various changes in the size, shape and materials, as well as in the details of the illustrated construction, may be made without departing from the spirit of the invention.

What is claimed is:

1. A valve apparatus for controlling flow of fluid under pressure, said valve apparatus having a Tee-shape housing adapted for mounting in a primary flow conduit for controling flow into and from a secondary conduit communicating with the primary conduit through the Tee-shaped housing, including:

a Tee-shaped integral valve housing having means for mounting said valve housing in a primary flow conduit to form a portion thereof, said housing having a cavity forming a substantially unrestricted, straight through fluid flow path for the primary conduit;

said valve housing having a first flow opening and a second flow opening, said first opening for operably communicating with a first portion of the primary conduit, said second opening operably communicating with a second portion of the primary conduit, said first and second flow openings aligned to cooperate with said cavity to provide the substantially unrestricted straight through flow path for the primary flow through said valve housing;

first means with said valve housing adjacent said first opening for operably securing said valve housing with the primary conduit;

second means with said valve housing adjacent said second opening for operably securing said valve housing with the primary conduit.

said cavity communicating with a third flow opening formed in said valve housing, said third opening disposed at substantially a right angle to the straight through flow path between said first and second openings;

said valve housing having means for operably connecting said third opening with a secondary conduit;

closure means mounted with said valve housing in said cavity for controlling flow between said straight through flow passage and the secondary conduit in response to movement of said closure means between a flow enabling position and a flow blocking position; and operator means exteriorly mounted of said valve housing and operably connected with said closure means for moving said closure means to and from the flow enabling and flow blocking positions to control pressurized fluid communication in said cavity to and from said third opening.

2. The valve apparatus as set forth in claim 1, wherein:

said closure means is formed by a vertically movable gate type closure element.

3. The valve apparatus as set forth in claim 2, wherein:

said operator means including a helically threaded stem means extending outwardly of said cavity for reciprocably moving said gate type closure element in response to relative circumferential rotation of said stem means.

* * * * *